Figure 1:
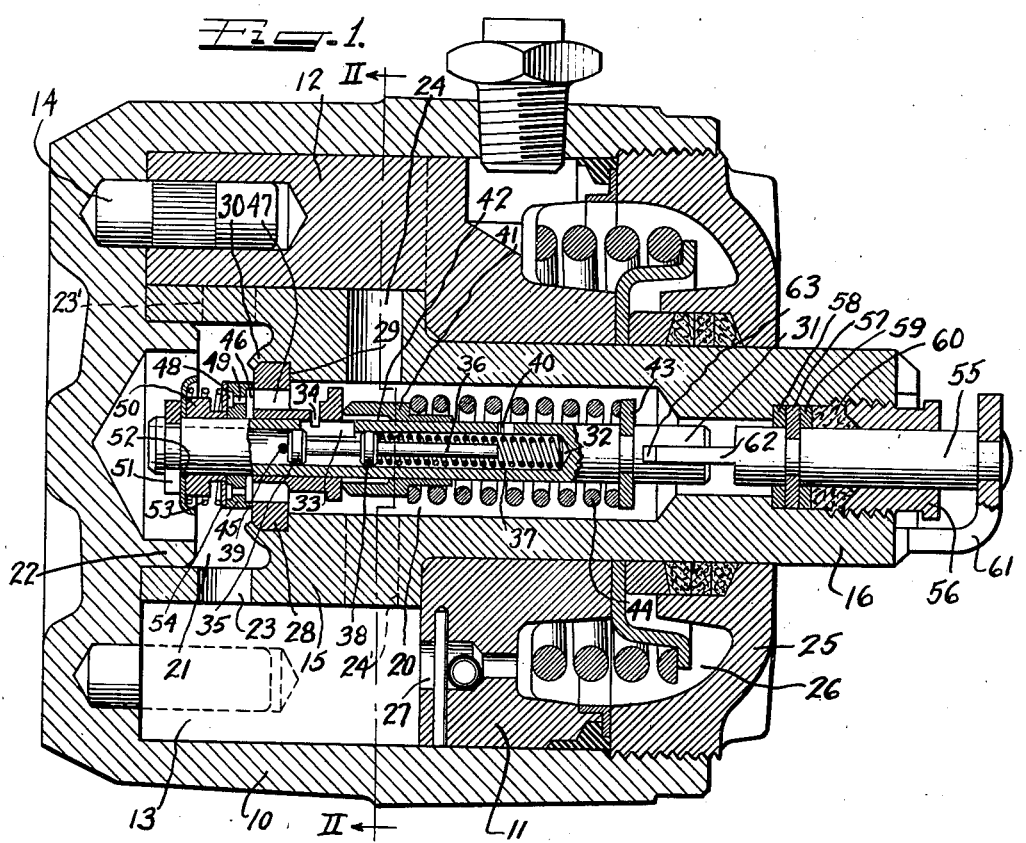

June 16, 1942.   G. M. MAGRUM   2,286,291
HYDRAULIC SHOCK ABSORBER VALVE STRUCTURE
Filed May 15, 1941

Inventor
GERVASE M. MAGRUM.

Patented June 16, 1942

2,286,291

UNITED STATES PATENT OFFICE 2,286,291

HYDRAULIC SHOCK ABSORBER VALVE STRUCTURE

Gervase M. Magrum, Buffalo, N. Y., assignor, by mesne assignments, to Houdaille-Hershey Corporation, Detroit, Mich., a corporation of Michigan Application May 15, 1941, Serial No. 393,528

2 Claims. (Cl. 188—100)

This invention relates to valve structure and assembly designed particularly for use in hydraulic shock absorbers on automotive vehicles for efficiently controlling the hydraulic fluid flow for control of the vehicle springs throughout their range of functioning both during bound movement and rebound movement.

The invention relates particularly to that type of valve assembly in which static valves control the fluid flow for functioning the springs during their initial or slow movements and blowoff valves function during abnormal or more sudden movements of the springs, as for example with valving structure disclosed in Peo et al. Patent No. 2,139,912 dated December 13, 1938.

The important object of the present invention is to provide improved and more efficient arrangement and operation of the orifice structure for ordinarily controlling and metering the fluid flow, and the cooperation of the static valves and the blowoff valves so that all of the vehicle spring movements will be sequentially and efficiently controlled.

Figure 2:
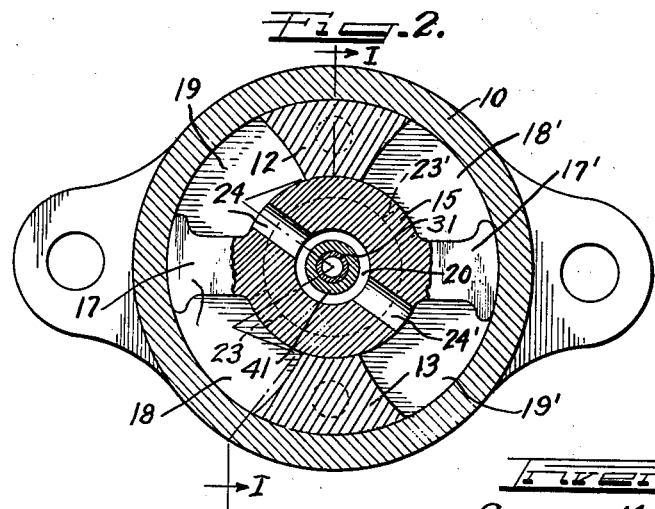

The various features of my invention are incorporated in the structure shown on the drawing, in which drawing:

Figure 1 is a cross section on plane I—I of Figure 2 of a hydraulic shock absorber with my improved valving assembly as applied; and Figure 2 is a cross section on plane II—II of Figure 1, certain portions of the valve mechanism having been omitted for clarity of showing.

Briefly describing the shock absorber body structure, it comprises a cup-shaped housing 10 into which fits the bearing wall 11 having the extensions 12 and 13 extending to the base of the housing 10 at diametrally opposite points, pins 14 holding the wall and extensions against rotary displacement in the housing. A piston structure comprises a cylindrical hub 15 and a shaft 16 therefor extending through and having bearing in the wall 11, the piston hub having vanes 17 and 17' extending therefrom between the extensions or abutments 12 and 13. The vanes and abutments divide the space within the housing 10 into high pressure working chambers 18 and 18' and low pressure working chambers 19 and 19' in which fluid is displaced upon oscillation of the piston structure, the shock absorber housing being usually mounted on the vehicle chassis and the outer end of the piston shaft being connected by levers with the axle structure.

The shaft has the bore 20 which continues into the piston hub where it is expanded to provide the recess 21 which receives the boss 22 on the housing base forming an additional bearing for the piston structure. The recess or space 21 is connected with the high pressure working chambers 18 and 18' by passages 23 and 23' through the wall of the hub 15, and the shaft bore 20 is connected with the low pressure working chambers 19 and 19' through passageways 24 and 24' extending through the hub 15.

The bearing wall 11 is held in service position in the housing 10 by a cover structure 25 surrounding the shaft and having threaded engagement in the outer end of the housing, the wall 11 and cover 25 having opposed recesses forming a reservoir 26 from which hydraulic fluid is fed to the working chambers through check valve controlled passageways 27 in a manner well understood in the art.

At the inner end of the shaft bore 20 is a valve seat member 28 of spool shape whose inner flange seats against a shoulder 29 against which it is held by peening thereagainst the metal 30 forming part of the piston hub, the seating member being disposed between the passageways 23, 23' and the passageways 24, 24'.

Extending through the shaft bore 20 and the bore of the seat member 28 is a cylindrical valve stem 31, this stem having the bore 32 communicating at its inner end with the chamber 21 from which the passageways 23, 23' extend. This valve stem has the port slot 33 spanning the outer flange of the seat member 28, and the body of the seat member has a circumferentially extending orifice 34 therein for communication with the valve port. This orifice is interposed in the flow of the hydraulic fluid between the high and low pressure working chambers and controls the resistance to such flow, the resistance being adjustable by turning of the valve stem to expose more or less of the orifice to the valve port 33. The orifice functions particularly to control the rebound flow during normal operation of the shock absorbers. This normal rebound flow is from the working chambers 18, 18' through the passages 23, 23' into the chamber 21 and through the bore of the valve stem and valve port 33 and orifice 34 and then to the working chambers 19 and 19' through the passageways 24, 24', the outer flange of the seat member being shaped to permit free flow from the orifice to the passageways 24, 24'.

Within the outer portion of the valve stem bore is a static valve 35 on the inner end of a stem 36 extending outwardly in the bore 32, a spring 37 within the bore between the outer end thereof and an abutment head 38 on the valve stem tending to hold the valve 35 against a stop 39 which may be in the form of a pin extending transversely through the valve stem 31. In its normal position the valve is against its stop a distance inwardly of the valve port 33 so as to prevent and oppose flow from the chamber 21 through the valve stem to the port 33 and orifice 34. The valve retains this normal position during the starting movements of the vehicle springs on rebound until the flow pressure within the shock absorber becomes sufficient to shift the valve against the resistance of the spring 37 to expose the valve port 33 so that the orifice 34 may then take up the burden of control of the flow and the vehicle springs movement. The guide head 38 fits in the valve stem bore outwardly of the valve port 33, and a vent opening 40 is provided in the stem so that the head 38 may move freely in the stem bore for setting of the valve 35 under pressure or force of the spring 37.

Outside of the valve seat member 28 a high pressure blowoff valve member 41 is slidable on the valve stem, this valve member being counterbored at its inner end to provide the annular recess 42. On the outer end of the valve stem 31 is secured a washer 43 between which and the blowoff valve is interposed a spring 44 which tends to hold the valve seated against the outer end of the seat member 28. The valve stem port 33 extends a distance outwardly from the outer end of the valve seat member 28 so that the annular space or recess 42 in the blowoff valve is in communication with the valve stem bore between the static valve 35 and the guide head 38 for this valve. Under normal pressure conditions on rebound, the blowoff valve 41 remains seated and the displaced fluid flow will be controlled by the orifice 34. Under abnormal pressure impulses, the blowoff valve 41 will be unseated by the pressure of the displaced fluid against the inner wall of the valve recess 42 and the fluid will then flow past the blowoff valve and through the passageways 24, 24' to the low pressure working chambers, and after such abnormal pressure impulse, the spring 44 will reset the blowoff valve to its seated or closed position so that the orifice 34 may resume control. Abnormal blowoff pressure will shift the valve 35 outwardly past the valve port 33 against the comparatively weak resistance of the spring 37 so that the displaced fluid may flow freely from the high pressure working chambers past the open blowoff valve to the low pressure working chambers of the shock absorber.

The bound or compression flow is also controlled by a static valve and a blowoff valve. The blowoff valve 45 is mounted on the valve stem at the inner end of the valve seat member 28. This valve has the annular recess 46 in its outer side communicating with passageways 47 through the inner flange of the valve seat member and in its inner side the valve has the annular recess or space 48, one or more flow controlling orifices 49 extending through the valve between the recesses 46 and 48. Inwardly of the blowoff valve 45 an abutment collar 50 is mounted on the valve stem and at its inner end the valve stem 31 has an abutment washer 51 secured thereto between which and the collar 50 a plate 52 is set to be abutted by a spring 53 which engages against the static valve 54 in the form of an annular disc, the spring normally holding this static valve against the inner side of the blowoff valve to shut off flow through the blowoff valve orifices 49. The outward pressure of the spring 44 against the washer 43 on the valve stem is communicated to the washer 51 at the inner end of the valve stem this pressure acting through the collar 50 against the blowoff valve 45 to hold this valve normally seated against the inner end of the valve seat member 28 to shut off flow through the passages or ports 47.

During starting or slow compression movement of the vehicle springs the shock absorber fluid flow will be resisted by the static valve 54 which will be held closed by the comparatively light spring 53 until the pressure becomes sufficient to open the static valve, and then the normal compression flow will be from the low pressure working chambers of the shock absorber through the passages 24, 24', the ports 47 through the valve seat member 28, and through the orifices 49 in the blowoff valve 45 and past the opened static valve and through the passageways 23, 23' into the high pressure working chambers. Under abnormal pressure impulses during the compression movement of the vehicle springs the pressure against the blowoff valve 45 will cause unseating of this valve against the resistance of the spring 44, but the blowoff valve is reseated as soon as the pressure becomes normal so that the orifices 49 in the blowoff valve may resume control of the fluid flow, compression flow through the orifice 34 being prevented by the static valve 35.

Turning of the valve stem 31 for adjustment of the orifice 34 is accomplished by the adjusting stem 55 extending into the outer end of the shaft bore 20 through a plug 56. This setting stem is axially held by a washer 57 clamped between washers 58 and 59, packing material 60 surrounding the stem between the washer 59 and the plug 56, a lever or arm 61 being secured to the outer end of the stem by which it may be readily turned. At its inner end the adjusting stem 55 has a tongue 62 engaging in the slot 63 at the outer end of the valve stem 31, this tongue and slot connection permitting the valve stem to shift axially in response to abnormal blowoff pressure against the blowoff valve 45. Upon turning of the adjusting stem 55 the valve stem may be turned in any direction for adjustment of the size of the orifice 34.

I thus produce a compact valving assembly in which a spring pressed static valve within the valve stem bore offers resistance to the rebound flow during starting or comparatively slow rebound movement of the vehicle springs until the spring movement is sufficient to create hydraulic flow pressure in the shock absorber sufficient for accurate control by the orifice, together with a static valve functioning in like manner for the flow caused by the bound or compression movement of the vehicle springs, and separate blowoff valves resisted by a common spring for response to abnormal bound or rebound pressure impulses. I do not, however, desire to be limited to the exact construction, arrangement and operation shown and described, as changes and modifications may be made without departing from the scope of the invention.

I claim as my invention:

1. A valving assembly for controlling the bound and rebound flow in a hydraulic shock absorber, comprising a seat member interposed in the path of the fluid flow, a valve stem extending through said seat member and having a passageway therethrough for rebound fluid flow, an adjustable orifice communicating with said valve stem passageway for metering the rebound flow therethrough, a static valve movable in said valve stem passageway, a spring normally holding said static valve in advance of said adjustable orifice for resisting the rebound flow until the pressure becomes sufficient to shift said static valve against the spring power for exposure of said adjustable orifice for metering thereby of the rebound fluid flow, a blow-off valve mounted on said valve stem, and a spring normally holding said blow-off valve seated against said seat member but responsive to abnormal rebound flow pressure to permit unseating of the blow-off valve for providing a low resistance flow path for the rebound fluid in shunt of the path through said adjustable orifice.

2. A valving assembly for controlling the displaced fluid flow in a hydraulic shock absorber, comprising a seat member interposed in the path of the flow, a supporting member extending from said seat member and having a passageway therethrough for the fluid flow, a port in said supporting member communicating with said passageway, a metering orifice in said seating member communicating with said port, a static valve movable within said passageway, yieldable means normally holding said static valve in position to close said port whereby said static valve will resist flow through said passageway until the flow pressure becomes sufficient to move said static valve against said yieldable means for control thereafter of the flow by said metering orifice, a blow-off valve mounted on said supporting member, and a spring normally holding said blow-off valve seated against said seat member for exposure of the blow-off valve to the flow to said port and orifice, said spring yielding to abnormal fluid pressure for opening thereby of the blow-off valve for a reduced flow path for the fluid in shunt of said orifice path.

GERVASE M. MAGRUM.